United States Patent [19]

Brems

[11] Patent Number: 4,472,983
[45] Date of Patent: Sep. 25, 1984

[54] PROGRAMMABLE DRIVE MECHANISM

[76] Inventor: John H. Brems, 2800 S. Ocean Blvd., Apt. 16-D, Boca Raton, Fla. 33432

[21] Appl. No.: 346,927

[22] Filed: Feb. 8, 1982

[51] Int. Cl.³ .................... F16H 37/06; F16H 5/06; B23B 29/24
[52] U.S. Cl. ................ 74/665 G; 74/337.5; 74/813 C
[58] Field of Search ............ 74/337.5, 813 C, 665 G, 74/113, 568 M, 820

[56] References Cited

U.S. PATENT DOCUMENTS

| | | | |
|---|---|---|---|
| 2,259,948 | 10/1941 | Bullard | 74/820 |
| 2,742,795 | 4/1956 | Wommelsdorf | 74/337.5 |
| 2,866,341 | 12/1958 | Changry | 74/568 M |
| 2,907,221 | 10/1959 | Haupt | 74/337.5 |
| 2,919,593 | 1/1960 | Spohn | 74/337.5 |
| 2,974,811 | 3/1961 | Dammert et al. | 74/820 |
| 3,548,672 | 3/1969 | Conrad | 74/337.5 |
| 3,637,055 | 1/1972 | Young | 74/337.5 |
| 3,638,513 | 2/1972 | Polodetkin et al. | 74/820 |
| 3,675,503 | 7/1972 | Upadhyay | 74/820 |
| 3,730,014 | 5/1973 | Brems | 74/394 |
| 3,789,676 | 2/1974 | Brems | 74/29 |
| 3,859,862 | 1/1975 | Brems | 74/82 |
| 3,938,396 | 2/1976 | Brems | 74/55 |
| 4,018,090 | 4/1977 | Brems | 74/52 |
| 4,075,911 | 2/1978 | Brems | 74/816 |
| 4,173,905 | 11/1979 | Byrt et al. | 74/813 C |
| 4,262,563 | 4/1981 | Brown et al. | 74/821 |
| 4,271,727 | 6/1981 | Brems | 74/821 |
| 4,383,454 | 5/1983 | Calabrese | 74/337.5 |

FOREIGN PATENT DOCUMENTS 2716901 10/1978 Fed. Rep. of Germany .... 74/813 C

Primary Examiner—Leslie A. Braun
Assistant Examiner—Michael J. Gonet
Attorney, Agent, or Firm—Barnes, Kisselle, Raisch, Choate, Whittemore & Hulbert

[57] ABSTRACT

A motion generating system in which multiple movements are to be generated with multiple interrelated elements or multiple movement paths generated by a given input. There is a primary input which drives an acceleration-deceleration device from one stopped dwell position to another stopped dwell position. Associated with the drive device is a primary output member with multiple output means mechanically associated therewith and shift means in the mechanism driven by the input member to selectively connect and disconnect one or more of each multiple output means relative to the primary output means. The connection and disconnection is designed always to occur during a dwell position of the primary output means.

10 Claims, 23 Drawing Figures

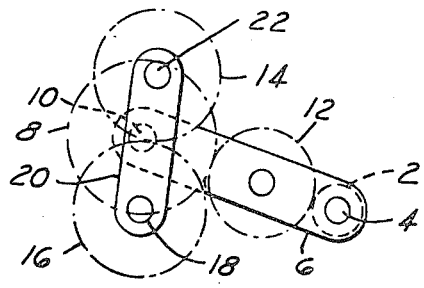
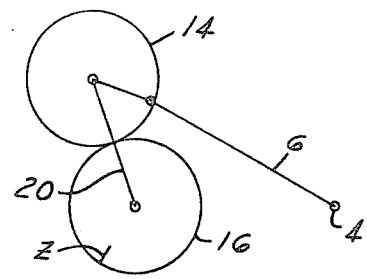
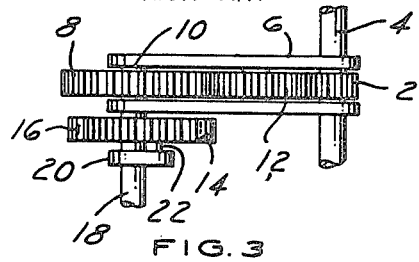
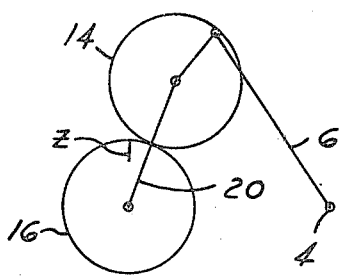
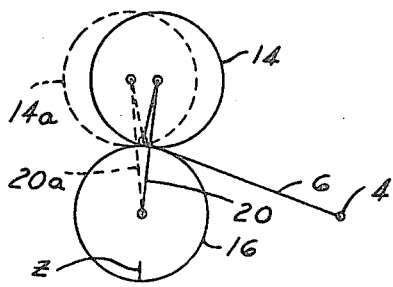
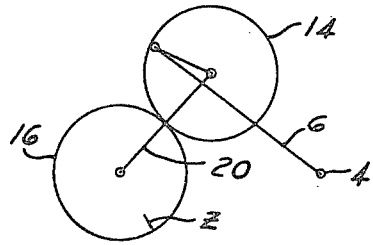
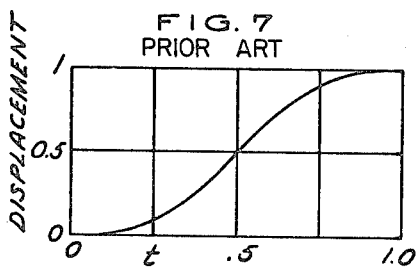
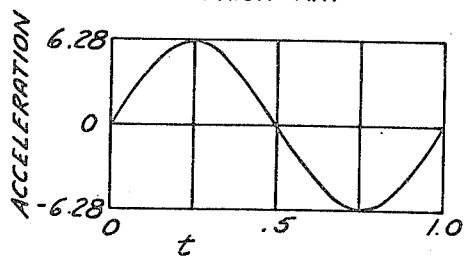
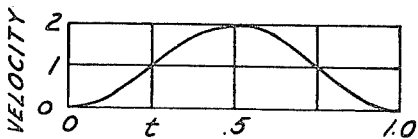

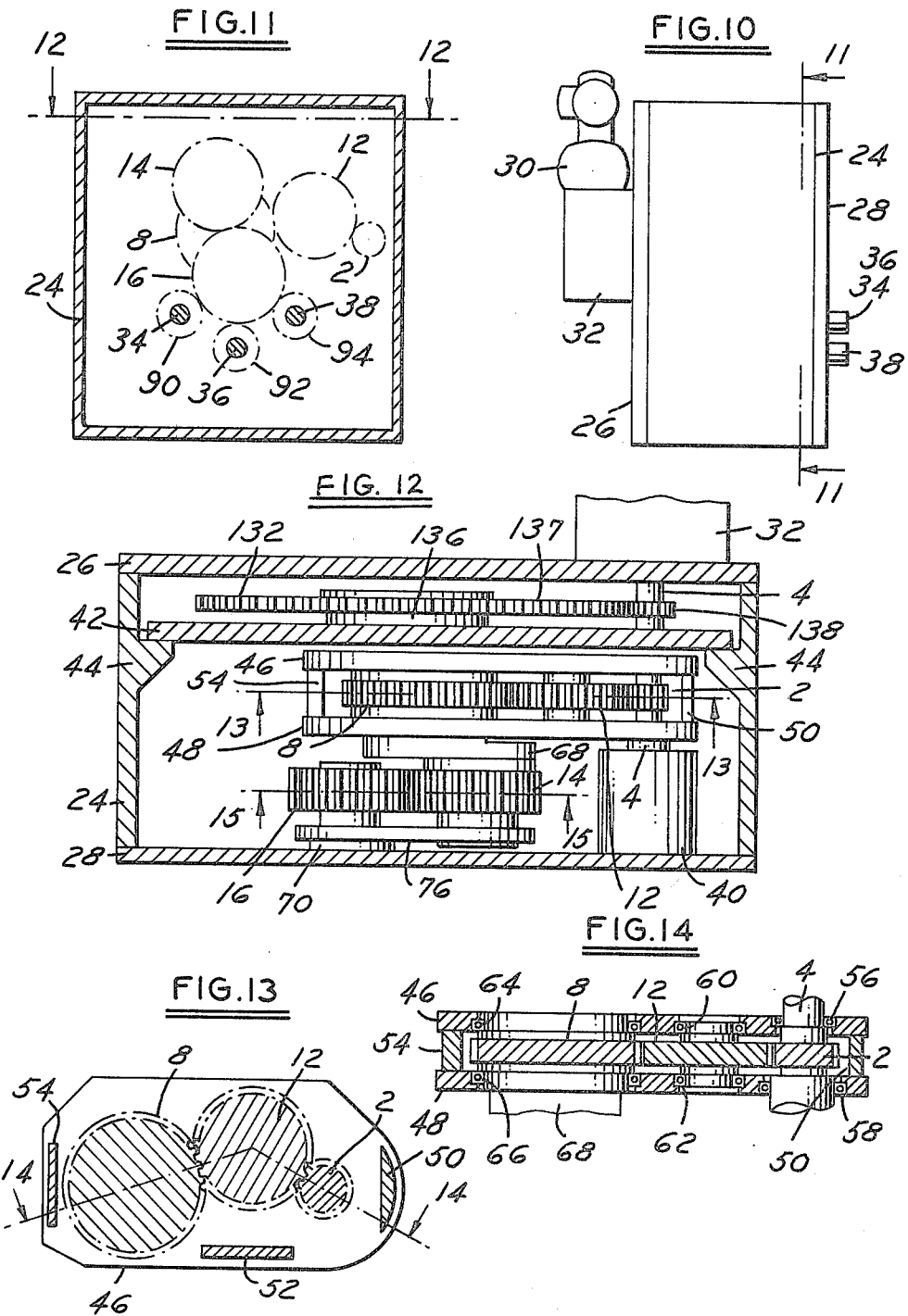

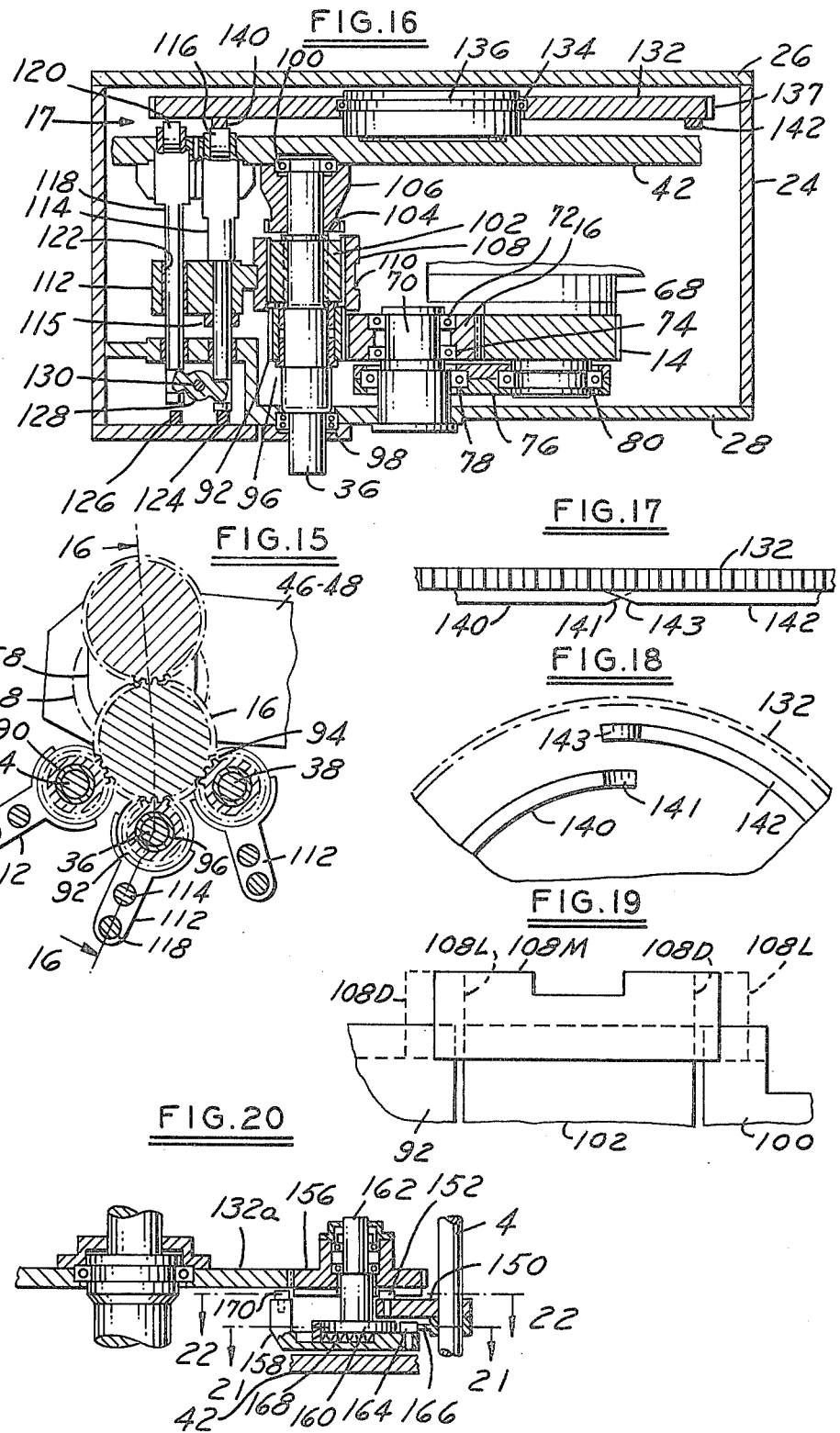

PROGRAMMABLE DRIVE MECHANISM

FIELD OF INVENTION

Mechanism for simultaneously or sequentially selectively driving multiple mechanical output systems from a single accelerating-decelerating mechanism.

BACKGROUND OF THE INVENTION

In the general field of mechanical design, there arise many applications in which it is desired to achieve multiple types of movements of a given element or to achieve interrelated movements of separate elements, and in which each given movement is from one stop position to another stop position. When such movements involve large masses and are relatively fast, it is desirable to utilize an accelerating-decelerating type motion-generating mechanism to minimize impact, shock, or jerk; and each such movement requires its own accelerating-decelerating mechanism. Mechanisms driven by multiple cams which are rotationally interrelated are examples of such systems.

It is one object of the present invention to provide a system in which a single accelerating-decelerating mechanism is selectively coupled to multiple motion generating mechanisms for a single element, or selectively coupled to multiple elements to create a predetermined motion interrelationship of such elements. In essence, if a given accelerating-decelerating mechanism is considered as a prime mover, then that single prime mover can selectively, simultaneously and/or sequentially, be connected to multiple driven mechanisms to accomplish a predetermined design objective, whereas, in the absence of this invention, multiple such prime movers would be required to accomplish this same design objective.

Other objects and features of the invention will be apparent in the following description and claims in which the principles of the invention are set forth together with details of the structure which will enable a machine builder to utilize the invention, all in connection with the best modes presently contemplated for the practice of the invention.

Brief Description of the Drawings

DRAWINGS accompany the disclosure and the various views thereof may be briefly described as follows:

FIG. 1, a schematic side view of an accelerating-decelerating mechanism as disclosed in my U.S. Pat. No. 3,789,676.

FIG. 2, a top view of the mechanism shown in FIG. 1.

FIGS. 3 to 6, schematic sequential position diagrams of the mechanism shown in FIG. 1.

FIG. 7, a displacement diagram for cycloidal motion, over one cycle.

FIG. 8, a velocity diagram for cycloidal motion, over one cycle.

FIG. 9, an acceleration diagram for cycloidal motion, over one cycle.

FIG. 10, a side view of the housed mechanism of this invention.

FIG. 11, a transverse section taken on line 11—11 of FIG. 10.

FIG. 12, a horizontal section taken on line 12—12 of FIG. 1

FIG. 13, a transverse section taken on line 13—13 of FIG. 12.

FIG. 14, an angled section taken on line 14—14 of FIG. 13.

FIG. 15, a transverse section taken on line 15—15 of FIG. 12

FIG. 16, an angled section taken on line 16—16 of FIG. 15.

FIG. 17, an end view of the cam ring taken along arrow 17 in FIG. 16.

FIG. 18, a third angle projection view of FIG. 17.

FIG. 19, an enlarged view of the clutch collar midway through a shift sequence.

FIG. 20, a section through an alternate Geneva type mechanism to drive the cam base plate from the input shaft.

DETAILED DESCRIPTION OF THE INVENTION AND THE MANNER AND PROCESS OF USING IT

Figure 21:
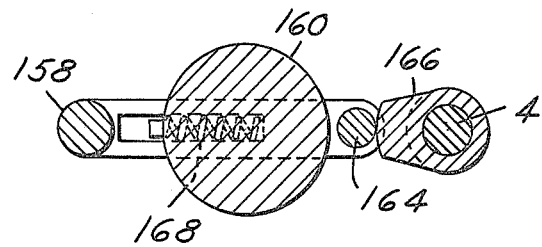
FIG. 21, a section taken on line 21—21 of FIG. 20.

This invention is concerned with a system in which a single accelerating-decelerating mechanism, which operates from one stopped position to another stopped position, is connected to and disconnected from multiple output mechanism.

An attractive, but by no means exclusive, accelerating-declerating mechanism suitable for this application is that disclosed in my U.S. Pat. No. 3,789,676.

FIGS. 1 and 2 are simplified schematic drawings of one embodiment of an approximate cycloidal motion generating mechanism from my U.S. Pat. No. 3,789,676. An input gear 2 is mounted on an input shaft 4 which is journalled in a suitable housing or frame and driven by an appropriate external drive system. Also journalled on the input shaft 4 is a tangential link 6 which oscillates thereon as will be described. A driving gear 8 is mounted on a shaft 10 journalled in the outboard end of the link 6, and an intermediate gear 12, also journalled in the link 6, is formed to mesh with the input gear 2 and driving gear 8. An eccentric gear 14 is mounted on the shaft 22 with an eccentricity approximately equal to its pitch radius. This eccentric gear 14 meshes with an output gear 16 mounted on a shaft 18 also journalled in the housing or frame. A radial link 20 is also journalled on the output shaft 18 at its one end; at its other end, the radial link 20 is journalled to a stub shaft 22 mounted concentrically on the eccentric gear 14. It is the purpose of this radial link 20 to keep the eccentric gear 14 in mesh with the output gear 16 as the eccentric gear 14 moves through its rotational and translational path.

When the mechanism is in the position shown in FIG. 1, it is in a natural dwell position, i.e., a small rotation of the input gear 2 causes a corresponding rotation of the driving gear 8 and the eccentric gear 14. This rotation of the eccentric gear 14 is accompanied by a corresponding movement of the shaft 22 about the shaft 18, such that the gear 14 literally rolls about the output gear 16 which remains stationary or in dwell.

A qualatative schematic representation of the motion of the output gear 16 during a complete 360° rotation of the driving gear 8 and eccentric gear 14, at 90° intervals, is shown in FIGS. 3-6. An arbitrary radial marker line Z has been added to the output gear 16 to show its position change at these intervals. FIG. 3 shows the position of all gears at the center of the dwell, which is the same configuration as shown in FIG. 1. Additionally, a second position is shown in which the driving gear 8 and eccentric gear 14 have been rotated 10° counterclockwise (as driven by intermediate gear 12 and input gear 2). The rolling action of the gear 14 on the output gear 16 which remains substantially stationary during this 10° interval can therefore be visualized. In this second position, the components are redesignated by the callout suffix letter a.

As the gears 8 and 14 continue to rotate counterclockwise, the output gear 16 is accelerated and moves in the clockwise direction. After 90° of this rotation of gears 14 and 8, the position shown in FIG. 4 is reached. At this point, the acceleration of gear 16 in the clockwise direction has reached its approximate maximum, and the velocity of the gear 16 in the clockwise direction is approximately equal to its average velocity.

As the gears 8 and 14 continue, their rotation counterclockwise from their position shown in FIG. 4, the output gear 16 continues to accelerate, at a decreasing rate, in the clockwise direction. After an additional 90° of rotation of gears 14 and 18, the positions shown in FIG. 5 is reached. At this point, the acceleration of the gear 16 has substantially returned to zero, and its velocity in the clockwise direction has reached an approximate maximum which is double the average velocity.

As the gears 8 and 14 continue to rotate counterclockwise from the position shown in FIG. 5, the output gear 16 continues to rotate clockwise but is decelerating. After an additional 90° of rotation of gears 8 and 14, or a total of 270° from the start of the cycle, the position shown in FIG. 6 is reached. At this point, the deceleration of the output gear 16 is at or near maximum, while the velocity of the output gear 16, still in the clockwise direction, has slowed down to approximately its average velocity.

As the gears 8 and 14 continue to rotate counterclockwise from the position shown in FIG. 6, the output gear 16 continues to rotate clockwise, but is still decelerating, though now at a decreasing rate. After an additional 90° of rotation of gears 8 and 14, or a total of 360° from the start of the cycle, the position shown in FIG. 3 is again reached, with the output gear 16 having completed one revolution and is now again in dwell.

It can be seen, therefore, that as the input gear 2 is driven by some external power means at a substantially constant angular velocity, the gears 8 and 14 are driven by the intermediate gear 12. Gears 8 and 14 have an angular velocity which is determined by the superposition of the effect of the oscillation of link 6 about shaft 4 on the velocity created by the input gear 2 so gears 8 and 14 do not rotate at a constant angular velocity. And the oscillation of the gear 14 along the arcuate path controlled by radial link 20 and created by its eccentric mounting on shaft 10 creates another superposition on the velocity of the output gear 16. With the proportions shown in FIGS. 1-6, the output gear 16 will come to a complete stop or dwell once in each revolution, since the pitch diameters of gears 14 and 16 are shown as being equal. If gear 16 were twice as large as gear 14, it would experience two complete stops per revolution. And if the gear 16 were replaced by a rack, the index stroke of that rack would be the pitch circumference of the gear 14. In all cases, whether the output member is a rotating gear as gear 16 or a linearly moving rack, the output stroke is equal to the pitch circumference of the gear 14. In the mechanism to be subsequently described, the output gear 16 has the same diameter as the gear 14 but this is a convenience, not a necessity.

Furthermore, if the output member driven by the gear 14 is a linearly moving rack, and if the centerline of shaft 10 passes through the pitch line of gear 14, then, as the link 6 becomes longer and longer, the output motion of the output rack member more closely approaches true cycloidal motion.

With the mechanism shown in FIG. 1, the output motion of gear 16 has the broad characteristics of cycloidal motion, but distortions exist which are caused by the short length of link 6 and the arcuate rather than linear path of shaft 22. To some degree, these distortions can be compensated for by the proper choice of gear ratio between input gear 2 and driving gear 8 and the ratio of the length of link 6 to the center distance between input shaft 4 and output shaft 18.

In order to determine the exact quantitative kinematic characteristics of the mechanism shown in FIG. 1, it is necessary to use numerical methods for which a programmable calculator or computer is a great convenience, but not a necessity. Setting up classical equations of motion and then differentiating to find velocity and acceleration is excessively laborious and time consuming. But numerical calculation for the exact determination of the output shaft position for a series of discrete positions of the input shaft can be accomplished using straightforward geometry and trigonometry. By making these calculations at sufficiently small intervals, it becomes possible, by numerical differentiation, to obtain the velocity, and then by numerically differentiating a second time, to obtain the accelerations. These calculations can be repeated as required for different values of the geometrical parameters to closely approximate the conditions to be described below.

Pure cycloidal motion displacement in unitized coordinates and using radian angular notation is given by:

$$S = \frac{1}{2\pi}(2\pi t - \sin 2\pi t) \tag{1}$$

where t is the input variable having a range of 0 to 1 for one cycle of cycloidal motion, and S is the output displacement, also having a range of 0 to 1.

The velocity is obtained by differentiation, whereupon:

$$V = 1 - \cos 2\pi t \tag{2}$$

The acceleration is obtained by differentiating again, whereupon:

$$A = 2\pi \sin 2\pi t \tag{3}$$

The values for equations (1), (2), and (3) are graphically portrayed in FIGS. 7, 8 and 9. These are the curves representing the kinematic conditions for pure cycloidal motion. As noted above, the mechanism of FIG. 1 can be made to generate approximate cycloidal motion of the output gear 6 for a constant angular velocity of the input gear 2 with a reasonable degree of accuracy by a proper choice of geometric parameters determined by numerical calculation and successive approximation.

The specific characteristic of cycloidal motion which is important and relevant to the mechanism of this invention is that the acceleration be substantially zero at the beginning and end of the index stroke as generated in the output gear 16. This creates a relatively long dwell which is useful for the shifting to be accomplished.

In FIGS. 10 and 11, the aforesaid accelerating-deceletating mechanism is enclosed in a housing 24, with covers 26 and 28 on which are also mounted a motor 30 and gear reducer 32 which drive the input shaft 4 (FIG. 12) and input gear 2. Also mounted in this housing are three output shafts 34, 36 and 38, which are selectively coupled to the output gear 16 of the accelerating-decelerating system, through a mechanism to be described.

FIG. 12, a section on FIG. 11, shows a plan view of the accelerating-decelerating mechanism and its output gear, while FIGS. 13 and 14 clarify the detail of this mechanism. Referring to FIGS. 10-14, the input shaft 4, driven by gear reducer 32 and motor 30, is journalled in the cover 26 and a boss 40 which is part of the cover 28; it is also journalled in an intermediate plate 42 supported in the housing 24 through lugs 44. Two link plates 46 and 48, connected by spacers 50, 52 and 54, are journalled on the input shaft through bearings 56 and 58, FIG. 14. These link plates 46 and 48 are the functional equivalent of the tangential link 6 in the previous kinematic description. The input gear 2 is mounted on the input shaft 4 between the link plates 46 and 48 and meshes with the intermediate gear 12 journalled in the plates 46 and 48 through bearings 60 and 62. The intermediate gear 12 in turn meshes with the driving gear 8 also journalled in the plates 46 and 48 through bearings 64 and 66. A cheek plate 68 is connected to one side of the driving gear 8 and eccentrically mounts the eccentric gear 14; this cheek plate is the functional equivalent of the connection between shaft 10 and gear 14 in the kinematic explanation. The eccentric gear 14 meshes with the output gear 16, which is journalled on a stationary shaft 70 through bearings 72 and 74, shown in section in FIG. 16, the stationary shaft 70 being mounted in the cover 28. A radial link 76 which is the equivalent of link 20 in FIGS. 1-6, is journalled on the stationary shaft 70 through bearing 78; at its other end link 78 is journalled through bearing 80 to a stub shaft 82 mounted on and concentric with the eccentric gear 14. For clarity of construction, the eccentric gear 14 and cheek plate 68 in FIG. 12 have been rotated approximately 90° out of their in dwell position as schematically illustrated in FIG. 3. The gear ratio between input gear 2 and driving gear 8 is shown as being 3:1 in this specific mechamism, but will operate over a wide range of ratios with very little change in the dwell characteristics of the mechanism, which are of primary concern in this application.

The mechanism as described to this point is prior art as covered in my U.S. Pat. No. 3,789,676. The primary structural difference lies in the fact that the output gear 16 is journalled on a stationary shaft 70 rather than being mounted on a shaft journalled in the housing and whose output was externally usable. In summary, this mechanism will drive the output gear from one dwell position to the next with the approximate motion characteristics shown in FIGS. 7, 8 and 9. In this design, the eccentric gear 14 is the same pitch diameter as the output gear 16; therefore, the distance the output gear moves from one dwell to the next is exactly one revolution.

Referring to FIGS. 15 and 16, the output gear 16 meshes with and drives three secondary output gears 90, 92 and 94 which are journalled on the output shafts 34, 36 and 38 respectively (FIG. 10). In this design shown, each secondary output gear 90, 92 or 94 has a pitch diameter equal to one-half the pitch diameter of the output gear 16; therefore, each secondary output gear makes two revolutions for each revolution of the output gear 16. The motion characteristics of each of these secondary output gears follows the motion pattern of the output gear 16 and accordingly comes to a dwell or stop every two revolutions. This 2:1 ratio was arbitrary and convenient; other ratios are also usable.

THE CAM PLATE COUPLING

The method of coupling or uncoupling each secondary output gear to the output shaft on which it is journalled is identical. Therefore, it will be understood that the system and technique described in connection with output shaft 36 and secondary output gear 92 in FIG. 16 applies also to the other output shafts and secondary output gears.

Referring to FIG. 16, the secondary output gear 92 meshes with the output gear 16 and is journalled on the output shaft 36 through bushings 96. The output shaft 36 is journalled in the cover 28 and the plate 42 through bearings 98 and 100. A clutch adaptor 102 is spline connected to the output shaft 36 and held in position axially with a snap ring 104. The outside of this adaptor 102 is formed into gear teeth exactly matching the gear teeth of the secondary output gear 92. A stationary ring 106 is bolted to the plate 42 and concentric with the output shaft 36. The end of this ring 106 facing the clutch adaptor 102 is also formed with gear teeth identical with those of the clutch adaptor 102 and the secondary output gear 92. A clutch collar 108 having internal gear teeth formed into its inside diameter is mounted for axial sliding on the outside of the clutch adaptor 102; these teeth are formed to mate with the teeth on the outside of the clutch adaptor 102. As shown in FIG. 16, the clutch collar 108 is simultaneously engaged with the clutch adaptor 102 and a portion of the secondary output gear 92 which extends beyond the output gear 16. In this position, the secondary output gear 92 drives the output shaft 36 through the clutch collar 108 and the clutch adaptor 102. The axial engagement between the clutch collar 108 and the secondary output gear 92 is only very slight since all the gear teeth around the periphery share the torque load.

A groove 110 formed in the outside diameter of the shift collar 108 is engaged by a shift yoke 112 mounted on a first shift rod 114 and held in place by a clamp collar 115. This first shift rod is mounted for axial movement in the plate 42 and the cover 28. At its one end a roller 116 is mounted into the first shift rod 114, for mechanical actuation, to be explained. A second shift rod 118 operates in parallel with the first shift rod 114; it too is mounted for axial movement in the cover 28 and the plate 42. A roller 120 is mounted into the second shift rod 118; and the shift yoke 112 is connected to the second shift rod 118 through a bushing 122. The inward movement of both shift rods is limited by two stops 124 and 126. A rocker 128 is pivotally mounted on a pin 130 mounted in the housing 24. This rocker engages slots in both shift rods and is so arranged that as one rod is moved in one direction, the other rod moves an equal amount in the other direction over the range of travel which is of interest.

A circular cam base plate 132 is mounted for rotation on a bearing 134 on a stub shaft 136 bolted to the plate 42. This cam base plate 132 has gear teeth 137 (FIG. 12) cut in its periphery which mesh with a pinion 138 on the input shaft 4, FIG. 12. It can be seen, therefore, that the cam base plate 132 rotates in synchronism with the input shaft, though at a much lower angular velocity; in this embodiment, the gear ratio between the input shaft 4 and the cam base plate 132 is 9:1. The cam base plate 132, therefore, makes one revolution for three cycles of acceleration-deceleration of the output gear 16, because of the 3:1 ratio between the input gear 2 and the driving gear 8. If the ratio between pinion 138 and the cam base plate 132 were 12:1, the cam base plate would make one revolution for each four cycles of the output gear 16.

A series of partial cam rings 140 are mounted on the cam base plate 132, and engage the rollers 116 or 120 on the shift rods 114 and 118. In FIG. 16, the presence of the ring 140 has depressed the shift rod 114, causing the shift yoke 112 to position the clutch collar so that it engages the secondary output gear 92.

Referring to FIGS. 17 and 18, an illustrative arangement of cam rings, it can be seen as the cam ring 140 is terminated with a short tapered section 141, a complementary cam ring 142 rises with a short tapered section 143; this complementary cam ring 142 is spaced radially on the cam base plate to cooperate with the roller 120 on the second shift rod 118. The section in which both cam rings 140 and 142 are tapered complementarily will be referred to as a transition section. It can be seen that as this transition section passes the rollers 116 and 120, the roller 120 is depressed by the enlarging section of the complementary cam ring 142; this moves the second shift rod 118 downward, causing the rocker 128 to pivot about the fixed pin 130 to lift the first shift rod 114 upward. The complementary tapered section 141 of the cam ring 140 permits the roller 116 on the first shift rod to move upward. As the first shift rod 116 moves upward, it carries the yoke 112 upward with it; as the yoke 112 moves upward, it, in turn, slides the clutch collar 108 upward disengaging the clutch collar from the secondary output gear 92 and engaging it (at its other end) with the stationary ring 106, thereby locking the output shaft 36 in a stationary position. Two very important factors must be noted relevant to the shift system just described. The first is that the transition section between the two cam rings 140 and 142 must actuate the shift rods 114 and 118 exactly during the natural dwell of the output gear 16 and secondary output gear 92. This is true whether the shift of the clutch collar 108 is from driving (connected to secondary output gear 92), to locked (connected to the stationary ring 106); or whether the shift is in the opposite direction from locked to driving, as occurs when the cam ring 140 again depresses the shift rod 114. The second factor is that during the axial shift of the clutch collar 108, in either direction, there occurs a brief period, or position range, in which the clutch collar is in simultanous engagement with both the secondary output gear 92 and with the stationary ring 106.

This situation is made clear by FIG. 19, which shows the clutch collar 108 at the midpoint of a shift as designated by the callout 108M, and in dotted lines as 108D when the collar is in the full drive position and as 108L when the collar is in the full locked position.

This transitional simultaneous engagement of the clutch collar 108 is permitted since the shift always occurs, and must occur, during the dwell of the secondary output gear. This is very desirable since the output shaft 36 is always under complete control. This output shaft 36 is either being accelerated and decelerated from one dwell position to another or it is locked in a position corresponding to the last natural dwell position in which a lock shift occurred. In the absence of the transitional simultaneous engagement of the clutch collar with both the secondary output gear 92 and the stationary ring 106, it would be possible for the output shaft 36 and clutch collar 108 to be rotated due to some external load during its transitional free condition. This would create a lack of knowledge of the shaft position, and worse, the male and female gear teeth which comprise the shift mechanism might fall out of registry and create a jam. Hence, the transitional simultaneous engagement of the clutch collar with its two mating elements is an absolute necessity.

The shifting process described in connection with the output shaft 36 and the section of FIG. 16 applies also to the other output shafts 34 and 38 and thieir associated secondary output gears 90 and 94. The shift mechanism described in connection with FIG. 16 is repeated three times. Each shift mechanism operates independently of the other two. This is made possible by positioning the centerline of rotation of the cam base 132 such that each of the rollers associated with a shift rod operates at a different radius on that cam base 132. There is space on the cam base 132 for three pairs, or, six, cam rings, with each pair of cam rings controlling the axial position of a clutch collar associated with one of the output shafts 34, 36 or 38.

It can be seen, therefore, that the positioning of the cam rings on the cam base establishes the output "pattern" of the output shafts 34, 36 and 38. As noted earlier, a shift can take place only during the dwell of the output gear 16. But during such a dwell, multiple shifts can take place; for example, one shaft can be disconnected from its secondary output gear, while another is being connected to its secondary output gear. This results in an extremely flexible motion generating system.

This mechanism is usable both as a constant direction system, in which case the shift patterns will repeat after one revolution of the cam base 132, or it can be used as a reversible system (by reversing the motor 30), in which case the shift pattern reverses while the system is operating in the reverse direction.

The essential elements of this invention are:

1. A mechanical accelerating-decelerating system, which, when operating with a constant input, provides a cyclic output having a stationary or dwell portion, a smoothly accelerated and then decelerated output motion terminating in another stationary or dwell portion, repeating this output pattern as long as the input continues. Such a system is illustrated in my U.S. Pat. No. 3,789,676.

2. Multiple output members which are selectively connectible to the output of the aforesaid accelerating-decelratingl system, and which are locked when not connected to the accelerating-decelerating system.

3. A programmable shift system, mechanically driven by the input, which can independently shift one or more of the ouputs from a locked to a driven condition, or vice versa, with such shifts mechanically timed to occur during the dwell of the accelerating-decelerating system, at which time there is no relative rotational motion between the elements being shifted. This permits the use of positive type clutches such as those illustrated using mating external and internal gears.

It can be seen that the shift mechanisms must be driven by the input shaft or some other intermediate driving point; it cannot be driven by the ouput since the shift must occur during the dwell of the output, when no movement is available to actuate a shift. In the embodiment described above, the shift mechanism is controlled by a cam base plate 132 driven directly by the input shaft 4 through pinion 138; the cam base plate, therefore, rotates at a nominally constant velocity. As noted earlier, the shifts must occur during the dwell of the output. Typically, this dwell represents about 1/15 of the time (or input angle) required for a total accelration-decelration cycle. Related to the cam rings 140 or 142, this means that the flat or dwell portion of a given cam ring must be 14 times longer than the tapered or rise portion. This tapered or rise portion is limited to a reasonable pressure angle, 30–45°, to actuate the shift rod rollers. These limitations together place a limit on the number of shift cycles which can be controlled during one revolution of the cam base plate 132.

THE GENEVA INDEX SYSTEM:

A means of increasing the number of shift cycles which can be controlled by a given diameter cam base plate is to move the cam base plate intermittently, but synchronizing its intermittent motion, such that it is moving while the primary accelerating mechanism is in dwell. A simple well known mechanism for accomplishing this is a 90° "Geneva" index system. In such a system the output is stationary during 270° of rotation of the index (input) arm; then the output rotates 90° while the index (input) arm rotates 90°. In other words, if the input rotates at a constant angular velocity, the output is stationary for ¾ of the time and then rotates 90° in the other ¼ of the time. Such a mechanism can be interposed between the input shaft and the cam base plate of this invention to quadruple the number of shift cycles controllable by a given cam base plate.

Figure 22:
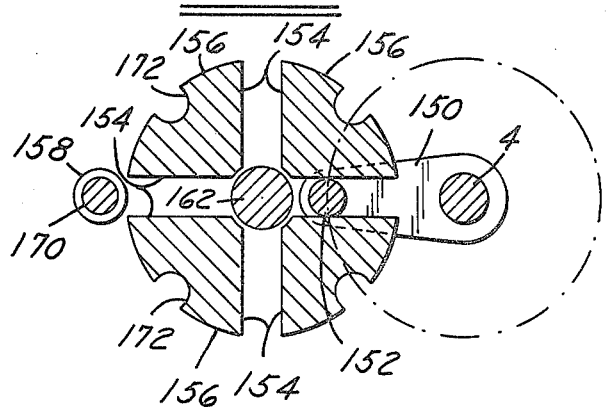
FIG. 22, a section taken on line 22—22 of FIG. 20.

This auxiliary mechanism is shown in FIGS. 20, 21 and 22. The input shaft is no longer directly connected to the cam base plate through direct gearing; instead a Geneva input arm 150 is fastened to the input shaft 4. A roller 152 on the outboard end of this arm is positioned to engage one of four slots 154 in a Geneva index plate assembly 156. The mechanism shown in FIGS. 20, 21 and 22 show the roller 152 at its maximum depth in a slot 154, i.e., in the middle of the 90° Geneva index. It will be understood that this roller enters and leaves a given slot tangentially to the centerline of that slot with a zero velocity of the Geneva index plate, as is typical of these mechanisms. During the 90° of rotation of the input shaft rotation in which the roller 152 is engaged in a slot 154 of the Geneva index plate, it is indexed 90°. During the remaining 270° of rotation of the input shaft 4, arm 150, and roller 152, the Geneva index plate is not moved and is held stationary by a simple locking mechanism. This mechanism consists of a lock bar 158 which is movable in a slot in a flange of an intermediate stationary shaft 162 on which the Geneva index plate is jouranlled. A roller 164 is mounted on one end of the lock bar 158 and cooperates with a cam 166 on the input shaft 4. The lock bar is loaded against the cam by a spring 168; at its other end the lock bar is formed into an upward extension in which is mounted a lock roller 170. The cam 166 and arm 150 are interrelated such that at the end of each Geneva index, the lock roller 170 enters one of four lock slots 172 (FIG. 22) in the Geneva index plate, holding it stationary during the next 270° rotation of shaft, arm and cam. As the roller 152 enters the next slot, the cam 166, acting against the spring 158, moves the lock bar 158 so as to move the lock roller 172 out of a lock slot 172. In essence then, the Geneva index plate is rotated 90° during 90° of rotation of the input shaft 4, and locked during the next 270° of input shaft rotation.

The periphery of the Geneva index plate 156 is formed into gear teeth which mate with the teeth formed into the periphery of a modified cam base plate 132A, on which the cam rings are mounted. It can be seen, therefore, that the motion of the cam base plate 132A consists of an index increment completed in one unit of time followed by a dwell of three units of time. If the phasing of motion is such that the tapered or rise sections of the cam rings 140 and 142 operate the shift rods during the natural dwell of the primary acceleration-deceleration mechanism, then the shift operation is identical with that previously described. However, since the cam base plate 132A is itself in dwell ¾ of the time, it is possible to shorten the angular distance between shift points on the cam base plate, or to allow more shift points on a given size cam base plate 132. In other words, a larger number of shift schedules or sequences can be programmed in a given space.

The Geneva indexing mechanism is a typical, but not exclusive, means of compressing the programming on the cam base plate. Other means include such intermittent motion mechanisms as barrel cams, plate cams, or comprable systems interposed between the input shaft and the cam base plate, phased such that a movement of the cam base plate takes place during the natural dwell of the primary accelerating-decelerating mechanism.

As noted earlier, the specific accelerating-decelerating mechanism described in this first embodiment is illustrative only. Another and more flexible mechanism such as covered in my U.S. Pat. No. 4,075,911 may also be employed to advantage. In this system, it is possible to modify the kinematic characteristics through the addition of higher harmonic components as described in the aforesaid patent. The means of adding these modifying higher harmonics is shown in FIG. 23, which corresponds to FIG. 14 of the original embodiment.

Figure 23:
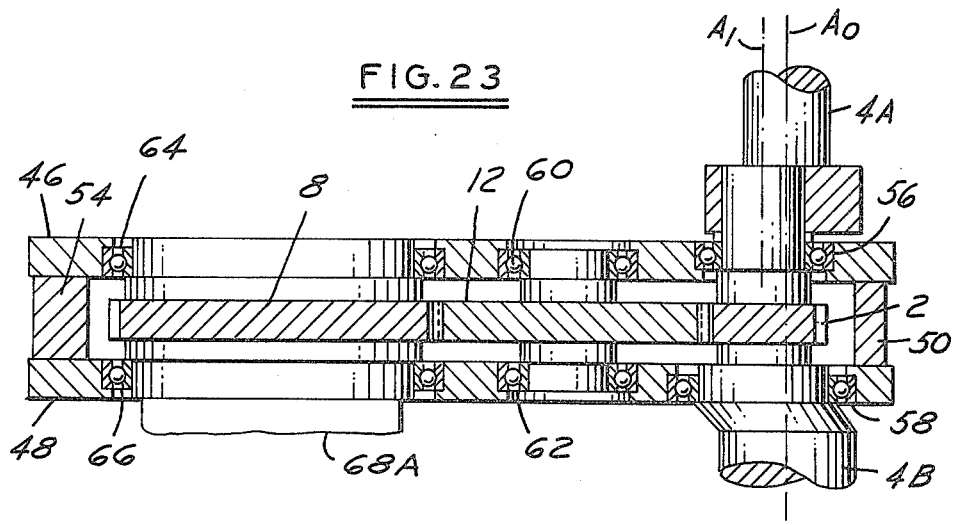
FIG. 23, a section corresponding to that of FIG. 14 but showing an alternate design to incorporate higher harmonic components as disclosed in my U.S. Pat. No. 4,075,911.

Referring to FIG. 23, a revised input shaft 4A and 4B (for assembly purposes) is mounted as before in the covers and intermediate plate, and rotates on an axis $A_o$. The input gear 2 is centered on an eccentric axis $A_1$ displaced some small distance from the axis $A_o$. The link plates 46 and 48 are journalled on the input shaft 4A, 4B through the bearings 56 and 58 which are concentric with the eccentric axis $A_1$. The remainder of the gear train, bearings, and other components of this subassembly are the same as shown in FIG. 14, except that the cheekplate 68A is slightly altered to provide for a compensating revised eccentricity between the driving gear 8 and the eccentric gear 14. The remainder of the input shaft 4A, 4B is unaltered from the configuration previously described.

As will be noted from the kinematic explanations in my U.S. Pat. No. 4,075,911, the addition of a higher harmonic component creates a large degree of kinematic design flexibility. Specifically, when this feature is incorporated into this present invention, it becomes possible to design the accelerating-decelerating mechanism such that the inherent natural dwell is significantly improved, or the velocity and accelerations can be modified to suit specific application requirements.

This aforesaid modification to incorporate the features described in my U.S. Pat. No. 4,075,911 is a very minor physical modification to produce significantly more kinematic flexibility. An essential element of this invention is a primary gear such as gear 16 which is moved through repetitive steps, where each such step is comprised of a smoothly accelerated movement from a first dwell position followed by a smoothly decelerated movement to the next dwell. In the embodiments illustrated, the total movement of the primary gear was one revolution of that gear from dwell to dwell, i.e., 360° of rotation. This is convenient but not necessary. For some applications, other angles may be more convenient. If significantly larger index angles between natural dwell positions are desired, then it is possible to couple the output shaft (176) of the mechanism of my U.S. Pat. No. 4,271,727 to the primary gear 16 of the embodiment described to achieve the programmability to multiple independent outputs as described herein.

Other primary index systems suitable for driving the primary gear 16 of this invention are described in my U.S. Pat. Nos. 4,018,090; 3,730,014; 3,859,862 and 3,938,396. If smaller primary index angles are acceptable, a variety of conventional intermittent motion mechanisms may be employed to drive the primary gear 16. Among these are a barrel cam and cam follower system, a plate cam and follower system, or conjugate cams and followers system, provided only that in each instance, the natural dwell of the primary accelerating-decelrating mechanism is sufficiently long to permit the shift system to shift outputs as previously described.

I claim:

1. In a motion generating system in which multiple movements are to be generated with multiple interrelated elements or multiple movement paths generated by a given element, and in which each discrete movement is comprised of a smoothly accelerated and decelerated motion from one stopped dwell position to another stopped dwell position, that combination which comprises:
   (a) a single accelerating-decelerating means comprising an input member and primary output means, which, during the constant externally driven movement of the input member, inherently causes said primary output means to move intermittently from a dwell position to another dwell position in a smoothly accelerated-decelerated motion,
   (b) multiple output means connectible to multiple interrelated mechanical output systems,
   (c) shift means mechanically driven by said input member and adapted to selectively connect and disconnect one or more of said multiple output means to said primary output means in a predetermined pattern, with connecting and disconnecting always occurring during the dwell of said primary output means.

2. A mechanical system as in claim 1 in which any said multiple output means that is disconnected from said primary output means by said shift means is simultaneously connected to a stationary holding member.

3. A mechanical system as in claim 2 in which said primary output means is comprised of a primary output gear and multiple secondary output gears in mesh therewith, and in which said multiple output means comprises multiple output shafts on which said multiple secondary output gears are individually journalled and in which said shift means comprise:
   (a) a sliding clutch member mounted for axial sliding and radial driving relative to each of said multiple output shafts and having two axial positions including a first axial position in which said clutch member is engaged for radial driving with a said secondary output gear, and a second axial position in which said clutch member is engaged for radial holding with a said stationary holding member,
   (b) shift rod members mounted adjacent said respective clutch members, adapted to move said clutch members from a first axial position to a second axial position and vice versa, said shaft rod members being driven by,
   (c) cam means driven by said input member, with said cam means synchronously related to said accelerating-decelerating means to move any said shift rod member only during the dwell of said accelerating-decelerating means.

4. A mechanical system as in claim 3 in which said cam means is driven by said input member by a constant velocity connection.

5. A mechanical system as in claim 4 in which said cam means is driven by said input member by a gear connection.

6. A mechanical system as in claim 3 in which said cam means is driven by said input member through an intermittent motion mechanism.

7. A mechanical system as in claim 6 in which said intermittent motion mechanism is comprised of a Geneva mechanism.

8. A mechanical system as in claim 3 in which said clutch member is in simultaneous engagement with both said secondary output gear and said stationary holding member during a portion of the shift from its first axial position to its second axial position and vice versa.

9. A mechanical system as in claim 1 in which the accelerating-decelerating means having an input rotative drive member and an output member comprises:
   (a) a gear section mounted on the output member,
   (b) a means mounting the output member to guide it in a predetermined path,
   (c) a first gear to engage said gear section and drive said output member,
   (d) means guiding said first gear for rotational motion about its own center as said center oscillates along a path parallel to said output member to effect motion of said output member,
   (e) means guiding said rotative drive member for movement in a path relatively generally transverse to the path of the output member, and
   (f) means mounting said first gear in a non-rotational relation to said drive member with axes of said first gear and member parallel but spaced from each other wherein power rotation of said drive member causes it to rotate relatively about the center of said first gear.

10. A mechanical system as in claim 1 in which the accelerating-decelerating means having a power input means to impart a rotary motion and having a main output member for movement along a predetermined path comprises:
   (a) a first rotating pair comprising:
      (1) a first rotating member,
      (2) a first eccentric member mounted eccentrically in non-rotational relation to, and on said said first rotating member,
   (b) a second rotating pair mounted in fixed spatial relationship with said first rotating pair comprising:
      (1) a second rotating member, (2) a second eccentric member mounted eccentrically in non-rotational relation to, and on said second rotating member,
(c) means connecting for rotation said first rotatting pair and said second rotating pair for substantially integral angular velocity ratio,
(d) means connecting said main output member with said first eccentric member and with said second eccentric member comprising:

(1) a first output member in tangential driving engagement with the periphery of one of said eccentric member,
(2) a second output member rotatably mounted to the other of said eccentric members,
(e) said power input means being connected to one of said rotating pairs to impart a rotary motion to that said rotating pair.

* * * * *